US00RE42822E

(19) United States
(12) Reissued Patent
Slutter et al.

(10) Patent Number: US RE42,822 E
(45) Date of Reissued Patent: Oct. 11, 2011

(54) MODIFIED CONCENTRIC SPECTROGRAPH

(75) Inventors: Warren S. Slutter, Edison, NJ (US); Wu Jiang, Sunnyvale, CA (US); Alain F. R. Thevenon, Edison, NJ (US); Viviane D. Millet, Edison, NJ (US); Jeremy J. Goldstone, Hillsborough, NJ (US)

(73) Assignee: Horiba Jobin-Yvon, Inc., Edison, NJ (US)

(21) Appl. No.: 09/998,002

(22) Filed: Nov. 30, 2001

Related U.S. Patent Documents

Reissue of:
(64) Patent No.: 5,995,221
Issued: Nov. 30, 1999
Appl. No.: 08/884,417
PCT Filed: Jun. 27, 1997

U.S. Applications:
(60) Provisional application No. 60/039,207, filed on Feb. 28, 1997.

(51) Int. Cl.
*G01J 3/28* (2006.01)

(52) U.S. Cl. ..... 356/326; 356/328

(58) Field of Classification Search ..... 356/326, 356/328, 330–334, 305, 307
See application file for complete search history.

(56) References Cited

U.S. PATENT DOCUMENTS

| | | | |
|---|---|---|---|
| 2,594,334 | A | 4/1952 | Miller |
| 2,835,167 | A | 5/1958 | Pierce |
| 2,975,669 | A | 3/1961 | Jarrell et al. |
| 3,490,848 | A | 1/1970 | McPherson |
| 3,909,134 | A | 9/1975 | Pieuchard et al. |
| 3,930,728 | A | 1/1976 | Pieuchard et al. |
| 3,985,443 | A | 10/1976 | Danielsson et al. |
| 4,027,975 | A | 6/1977 | Turner et al. |
| 4,068,954 | A | 1/1978 | Da Silva |
| 4,087,183 | A | 5/1978 | Passereau |
| 4,241,999 | A | 12/1980 | Pouey |
| 4,300,835 | A | 11/1981 | Schiemann et al. |
| 4,312,569 | A | 1/1982 | Harada et al. |

(Continued)

FOREIGN PATENT DOCUMENTS

| | | |
|---|---|---|
| EP | 0862050 | 2/1998 |

(Continued)

OTHER PUBLICATIONS

J. Thomas Brownrigg, "Design and performance of a miniature dual-beam diode-array spectrometer," *Spectroscopy*. vol. 10, Iss. 9 (Nov.-Dec. 1995), pp. 39-44.

(Continued)

*Primary Examiner* — L. G Lauchman
(74) *Attorney, Agent, or Firm* — Brooks Kushman P.C.

(57) ABSTRACT

A modified concentric spectrograph for diffracting light with high stray light rejection without astigmatism is provided. The modified spectrograph includes a grating, a lens, and at least one entrance port and one exit port. The grating has a concave surface and a meridian plane with a first side and a second side. The lens has a substantially planar surface and a convex surface. Preferably, the convex and concave surfaces are substantially concentric. The ports are substantially located on different sides of the meridian plane near a focal plane of the spectrograph. The position of a focal plane may be modified using an optically transmissive triangular prism with a reflective surface, and an optically transmissive block. The position of a focal plane may further be modified with one or more optically transmissive plates. Methods for using the spectrograph are also provided.

102 Claims, 7 Drawing Sheets

U.S. PATENT DOCUMENTS

| | | | |
|---|---|---|---|
| 4,455,088 | A | 6/1984 | Koike |
| 4,575,242 | A | 3/1986 | Akiyama et al. |
| 4,618,260 | A | 10/1986 | Okubo |
| 4,850,706 | A | 7/1989 | Mikes |
| 5,066,127 | A | 11/1991 | Schwenker |

FOREIGN PATENT DOCUMENTS

| | | |
|---|---|---|
| FR | 2653879 | 3/1991 |
| FR | 2653879 | 5/1991 |
| JP | 5749822 | 3/1982 |
| JP | 6249308 | 3/1987 |
| WO | WO 9002928 | 3/1990 |

OTHER PUBLICATIONS

L. Mertz, "Concentric Spectrographs", *Applied Optics,* vol. 16, No. 12 (Dec. 1977), pp. 3122-3124.

MODIFIED CONCENTRIC SPECTROGRAPH

Matter enclosed in heavy brackets [ ] appears in the original patent but forms no part of this reissue specification; matter printed in italics indicates the additions made by reissue.

CROSS REFERENCE TO RELATED APPLICATION

This claims the benefit of U.S. provisional application No. 60/039,207, filed Feb. 28, 1997.

BACKGROUND OF THE INVENTION

This invention relates to diffraction-grating spectrographs. More particularly, this invention relates to concentric diffraction-grating spectrographs with modified arrangements of their optical components.

An optical spectrograph collects light at its entrance slit and forms an image of the entrance slit in the exit plane at the wavelengths present in the light source. Diffraction-grating spectrographs use one or more diffraction gratings to diffract light into specific wavelengths and to select a predetermined portion of the wavelengths present in that light.

Concentric spectrographs are particularly well suited for applications requiring sharp spectral and spatial imaging. One type of concentric spectrograph includes an entrance port, an exit port, a hemispheric field lens, and a concave diffraction grating that has a set of substantially parallel grating lines, or grooves. A concave grating has a reflective grating surface ruled on a concave surface, usually spherical, that disperses the light and focuses the spectrum. One advantage of such a grating is that it can be used without separate collimating optics. A concave grating inherently has an optical axis, which is a line that passes symmetrically through the center of curvature of the grating surface, and a meridian plane, which is a plane that contains the grating optical axis and that is substantially perpendicular to the grating lines. The entrance and exit ports of a conventional concentric spectrograph are positioned substantially in the meridian plane of the grating.

A conventional concentric spectrograph operates as follows. First, a light beam enters the spectrograph through the entrance port, which is substantially in the meridian plane of the grating. After passing through the entrance port, the light beam passes through the hemispherical lens, which causes the beam to diverge and form an expanding light cone. The longitudinal axis of that expanding light cone lies in the meridian plane of the grating. Next, the light beam is reflectively diffracted by the grating surface toward the lens in the form of a contracting light cone. The longitudinal axis of the contracting light cone also lies in the meridian plane. Once the light is incident on the surface of the lens, most of the light is transmitted by the lens and focused at the exit port for spectral analysis.

There are a number of advantages to the concentric spectrograph configuration over other known configurations, such as the Czerny-Turner configuration. First, concentric spectrographs form sharp images due to the inherent absence of Seidel aberrations. Second, concentric spectrographs can be designed with relatively large numerical apertures (e.g., numerical apertures greater than 0.7 are possible). Third, concentric spectrographs are anastigmatic, flat field devices in which linear dispersion is a function of groove density and wavelength. Fourth, concentric spectrographs provide equal magnification along and across the dispersion, which is important for convolution applications. Last, concentric spectrographs do not require the use of aspherical optical surfaces, which are relatively expensive.

Conventional concentric spectrographs, however, have a number of disadvantages. First, concentric spectrographs have difficulty preventing stray light from contaminating with the desired spectrum at the exit port of the spectrograph. Stray light may arise from a number of sources. Of particular concern is light which has been reflectively diffracted twice. Some of that light is directed toward the exit port, which appears as a faint undesirable spectrum that overlaps with the desired spectrum, a phenomenon called spectral overlap.

When a detector is placed at the exit port of a conventional concentric spectrograph, the desired and undesired spectra are both recorded by the detector. Therefore, the intensity of the desired spectrum cannot be measured independently from the undesired spectrum. In order to prevent undesirable spectra from polluting the desired spectrum, one or more filters may be placed along the optical path of the light beam, especially between the exit port of the spectrograph and the detector. Filtering, however, only works when the stray light has a different quality than the desired light, such as a different wavelength or polarization. When the wavelengths of the stray and spectral light are the same, conventional wavelength filtering techniques will not work. In any case, filtering reduces the intensity of the desired spectrum, which reduces the throughput of the spectrograph. Therefore, it would be desirable to provide a high throughput concentric spectrograph, which also has high stray light rejection without the use of filters.

Another common disadvantage of conventional concentric spectrographs is their relatively large F-numbers. As used herein, the term "F-number" refers to the ratio of an equivalent focal length of a lens to the diameter of its entrance pupil. When the F-number of a spectrograph is large, the solid angle in which light can enter the spectrograph is relatively small, which limits the throughput of the spectrograph. Also, spectrometers having large F-numbers require relatively long focal lengths, which make the instrument large.

It would therefore also be desirable to provide a concentric spectrograph that is compact, relatively inexpensive to manufacture, and relatively immune to miscalibration.

It would also be desirable to provide an inexpensive concentric spectrograph that provides an anastigmatic image at the exit port with reduced stray light.

SUMMARY OF THE INVENTION

It is an object of this invention to provide a modified concentric spectrograph for dispersing polychromatic light with increased stray light rejection at the exit port.

It is also an object of this invention to provide a modified concentric spectrograph that can be used to simultaneously disperse light from one or more polychromatic light sources.

It is another object of this invention to provide a modified concentric spectrograph which is compact, relatively inexpensive to manufacture, and relatively immune to miscalibration.

It is yet a further object of this invention to provide a modified concentric spectrograph that has a small F-number.

It is yet another object of this invention to provide an improved concentric spectrograph that can be constructed with conventional optical components.

In accordance with this invention, a modified concentric spectrograph with reduced stray light is provided. The spectrograph includes a diffraction grating, a lens, an entrance port, and an exit port. As described above, the grating is a concave type diffraction grating that (1) has a concave grating surface and (2) defines an optical axis and a meridian plane that contains that axis. The meridian plane has a first side and a second side. The lens has a substantially planar surface, a convex surface, and an optical axis. The lens is positioned so that its convex surface faces the concave surface of the grating and its optical axis is substantially coaxial with the optical axis of the grating. The entrance port is located substantially on the first side of the meridian plane and the exit port is located substantially on the second side of the meridian plane. Preferably, at least one of the ports faces the planar surface of the lens and is close to a focal plane, the location of which is determined by various factors, including the radii of curvature of the lens and grating.

A method by which the modified spectrograph operates is also provided. In a first step, polychromatic light passes through the entrance port, which is located at a perpendicular distance from the meridian plane. In a second step, the light is directed through the lens toward the grating surface so that the light is incident on that surface. In a third step, the light is reflectively diffracted by the grating surface, thereby dispersing the light. In a fourth step, the dispersed light is imaged with the lens at an exit port located substantially out of the meridian plane.

A modified concentric spectrograph that includes multiple entrance and exit ports and a method of its use are also provided.

BRIEF DESCRIPTION OF THE DRAWINGS

The above and other objects and advantages of the invention will be apparent upon consideration of the following detailed description, taken in conjunction with accompanying drawings, in which like reference characters refer to like parts throughout, and in which.

DETAILED DESCRIPTION OF THE INVENTION

Figure 1:
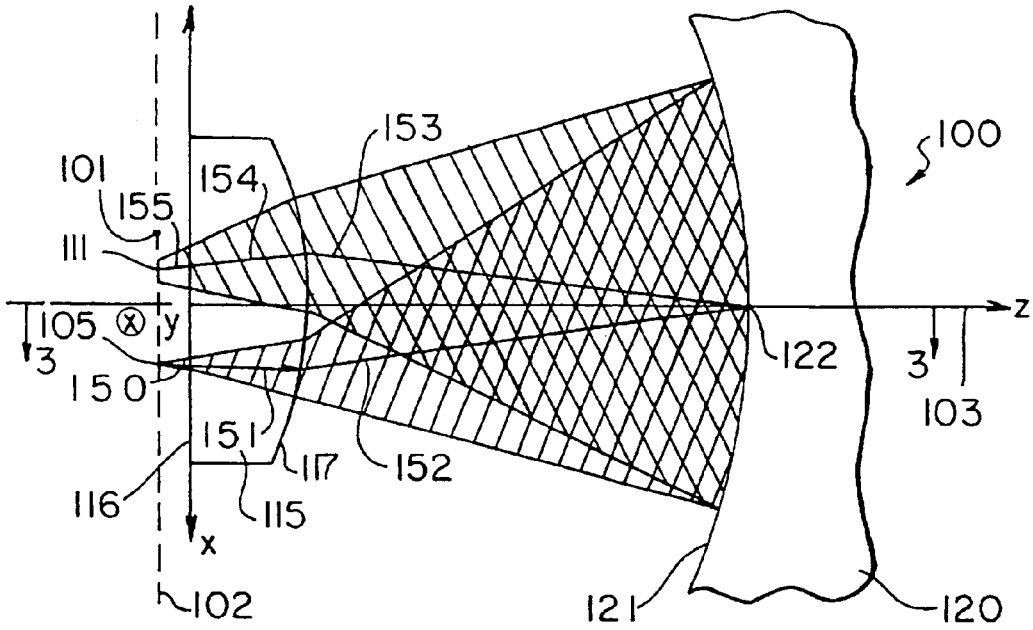
FIG. 1 PRIOR ART
FIG. 1 is a top plan view (X-Z plane) of a conventional concentric spectrograph showing a negative order of diffracted light.

According to the present invention, a method and apparatus for diffracting polychromatic light using a modified concentric spectrograph are provided. By means of this invention, polychromatic light is diffracted and imaged at an exit port with high resolution and increased stray light rejection.

Conventional concentric spectrographs include an entrance port, an exit port, a hemispherical lens, and a concave diffraction grating, which has a meridian plane. In operation, a beam of light enters the spectrograph through the entrance port and propagates substantially in and along the meridian plane until the diffracted light exits the spectrograph at the exit port. Therefore, the entrance and exit ports are positioned substantially in the meridian plane.

This arrangement, however, has the important disadvantage of contaminating the desired spectrum at the exit port with stray light due to internal reflections of other spectra. For example, conventional concentric spectrographs are designed to form an image of the entrance port in the exit plane, usually with either negative or positive first order light because these orders maximize throughput and minimize astigmatic aberrations of the image. However, in addition to the image formed by the desired order, one or more images may be formed near or in the exit plane by undesirable orders. For example, in a conventional concentric spectrograph that desirably forms an image of the entrance port in the exit plane using negative first order light, an image is also formed by negative second order light because a portion of that negative second order light is diffracted twice by the gating due to internal reflection and focused by the lens at the same place as the first order light —thereby mixing those orders at the exit port.

In accordance with the present invention, a modified concentric spectrograph is provided that reduces the amount of spectral overlap at the exit port, yet substantially preserves the high image quality there. Although the gratings and lenses of this invention may be arranged a similar way to a conventional concentric spectrograph, the entrance and exit ports are arranged differently. The entrance and exit ports of a conventional concentric spectrograph are substantially centered in the meridian plane of the grating. However, the entrance and exit ports of a modified conventional concentric spectrograph are located substantially out of the meridian plane. An advantage of this modified arrangement is that negative second order light that is reflectively diffracted twice is not directed toward the lens and focused at the exit port.

In accordance with the principles of the present invention, substantially no negative second order light is reimaged at the exit port overlapping the order of interest for the following reason. After diffraction by the grating once, a first portion of the negative second order light passes through the lens and is focused away from the exit port. Therefore, this first portion of the negative second order does not mix with the negative first order at the exit port. However, a second portion of the negative second order light is reflected by the surface of the lens back toward the grating and reflectively diffracted for a second time. In conventional concentric spectrographs, the second portion of the negative second order light, as well as the negative first order light, is focused at the exit port. However, according to the present invention, this second portion of negative second order light is not reflected back toward the exit port; the modified arrangement directs this second portion away from the exit port. Thus, mixing between negative first and negative second orders is substantially eliminated at the exit port of a spectrograph constructed in accordance with this invention.

The present invention may further include a housing for mounting any of the grating, lens, and ports. When the housing is made from an optically opaque material, it reduces undesirable stray light from contaminating the desired spectrum by preventing stray light from entering the housing.

The primary entrance and exit ports of a modified spectrograph constructed in accordance with the present invention are substantially out, and on different sides, of the meridian plane of the grating. However, the ports are operational in many positions on those sides. For example, in one embodiment of the present invention, the entrance and exit ports are positioned at an optical length from the planar surface of the lens, preferably near the primary focal plane of the spectrograph. The position of the primary focal planes is determined by the curvature of the lens and the grating, their relative positions, and the refractive index of the material between the lens and the exit port (e.g., glass, air, etc.). For example, when the curvature of the lens and grating increases, the optical length increases. Also, the optical length increases when the refractive index of the medium between the lens and the exit port increases.

In addition, the entrance and exit ports may be positioned near secondary, or modified, focal planes. These modified planes are different and preferably remote from the primary focal plane position. This provides more space at the ports for mounting additional optical instrumentation, such as optical detectors and cryostats.

One way in which a port may be moved to a modified focal plane is by the addition of a reflective surface between the primary port and the lens. A reflective surface may be added by adding an optical prism with a reflective surface. Preferably, the reflective surface is disposed on the hypotenuse of a right triangular block. In this way, the light propagates in the prism and reflects internally from that reflective surface.

The addition of the prism, however, changes the optical path length at that port. In order to preserve the optical path length at that port, the thickness of the lens at that port is preferably reduced. Also, the optical path lengths at both ports are preferably substantially similar. Therefore, when a prism is placed at one port, a second prism, an optical block, or a combination of both, is preferably placed at the other port. In fact, any number of optically transmissive bodies may be placed at each port, as long as the optical path lengths at both ports are within the design constraints of the spectrograph. The optically transmissive material used to form each optical body (e.g., prism or block) may be the same or different. Optically transmissive materials that have a large index of refraction can be used to elongate the effective focal length of the lens.

Also, one or more optically transmissive plates that have a large index of refraction may be used, in addition to optical blocks and prisms, to further adjust the effective focal length of the lens. Of course, modified focal planes may be oriented in any direction and fall on either side of the meridian plane using conventional optical techniques.

A method for using a spectrograph built in accordance with the principles of the present invention is also provided. In a first step, polychromatic light passes through an entrance port located on one side of the meridian plane of a concave diffraction grating. In a second step, a lens is used to direct the light toward a concave grating surface of the grating so that the light is incident on the grating surface at least in the meridian plane. In a third step, the light is diffracted by the diffraction grating. In a fourth step, the diffracted light is imaged with the same lens at an exit port which is located on the other side of the meridian plane.

Also according to the principles of this invention, a modified concentric spectrograph having multiple pairs of entrance and exit ports is provided. Such a spectrograph has at least two pairs of entrance and exit ports. The optical components that make up the multiple pair embodiment are essentially the same as the previously described single pair embodiment, except that the multiple pair embodiment has an extra pair of entrance and exit ports. The secondary ports, like the primary ports, are preferably located near a focal plane of the spectrograph, but should not substantially overlap with the primary ports. Of course, this spectrograph may include a housing for mounting some or all of the optical components and for preventing stray light from interfering with the spectra at the exit ports.

A method for diffracting two beams of light using a multiport spectrograph is also provided. The beams may be diffracted simultaneously or alternatively. As already described above, the spectrograph for use with this method includes a grating, a lens, a primary entrance port, a primary exit port, a secondary entrance port, and a secondary exit port. In accordance with the principles of this invention, the primary ports are located on opposite sides of the meridian plane and the secondary ports are located on opposite sides of the meridian plane.

In a first step, a first polychromatic light beam is diffracted. The first beam is diffracted by (1) providing the first beam at the primary entrance port, (2) directing the first beam with the lens toward the grating so that the first beam is incident on the grating in the meridian plane, (3) reflectively diffracting the first beam with the grating to form a first diffracted beam, and (4) imaging the first diffracted beam with the lens at the primary exit port.

And, in a second step, a second polychromatic light beam is diffracted. The second light beam is diffracted by (1) providing the second beam at the secondary entrance port, (2) directing the second beam with the lens toward the grating so that the second beam is incident on the grating, (3) reflectively diffracting the second beam with the grating to form a second diffracted beam, and (4) imaging the second diffracted beam with the lens at the secondary exit port.

A preferred embodiment of a modified concentric spectrograph according to the present invention, with several variations, is shown in FIGS. 5-12 and compared with a conventional concentric spectrograph, shown in FIGS. 1-4.

Figure 2:
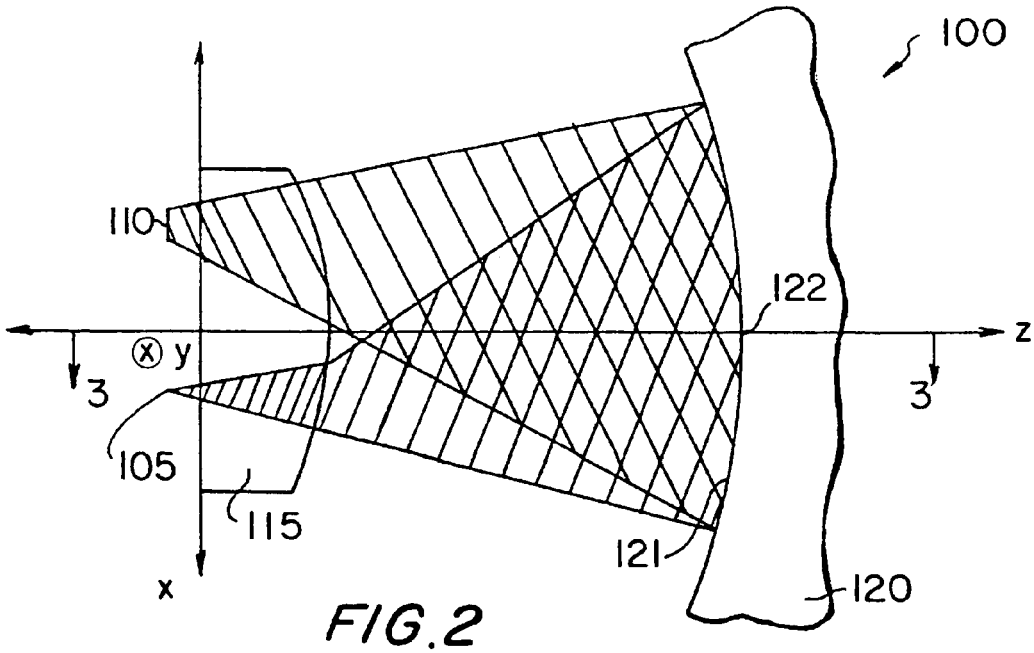
FIG. 2 PRIOR ART
FIG. 2 is another top plan view (X-Z plane) of the conventional concentric spectrograph of FIG. 1 showing a positive order of diffracted light.
Figure 3:
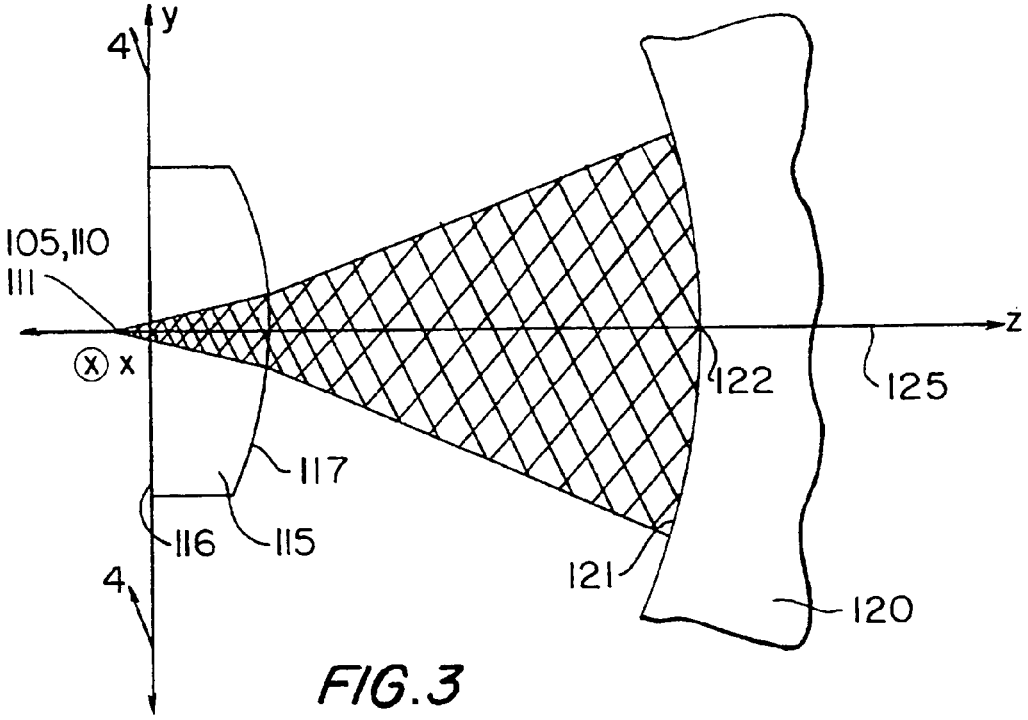
FIG. 3 PRIOR ART
FIG. 3 is a side view (Y-Z plane) of the conventional concentric spectrograph of FIGS. 1 and 2, taken from line 3-3 of FIG. 2.

As shown in FIGS. 1 and 2, conventional concentric spectrograph 100 includes entrance port 105, exit ports 110 and 111, hemispherical lens 115, and concave diffraction grating 120. In operation, light, in the form of a beam having a central axis, enters spectrograph 100 through entrance port 105 and propagates along an optical path, such that the central axis of the beam propagates in meridian plane (i.e., the X-Z plane), until the light exits spectrograph 100 at exit port 110. Lens 115 increases the diameter of the beam so that it substantially fills grating surface 121. After the light is reflectively diffracted by grating surface 121, lens 115 gathers the diffracted light and images it at an exit port, such as port 111.

Figure 4:
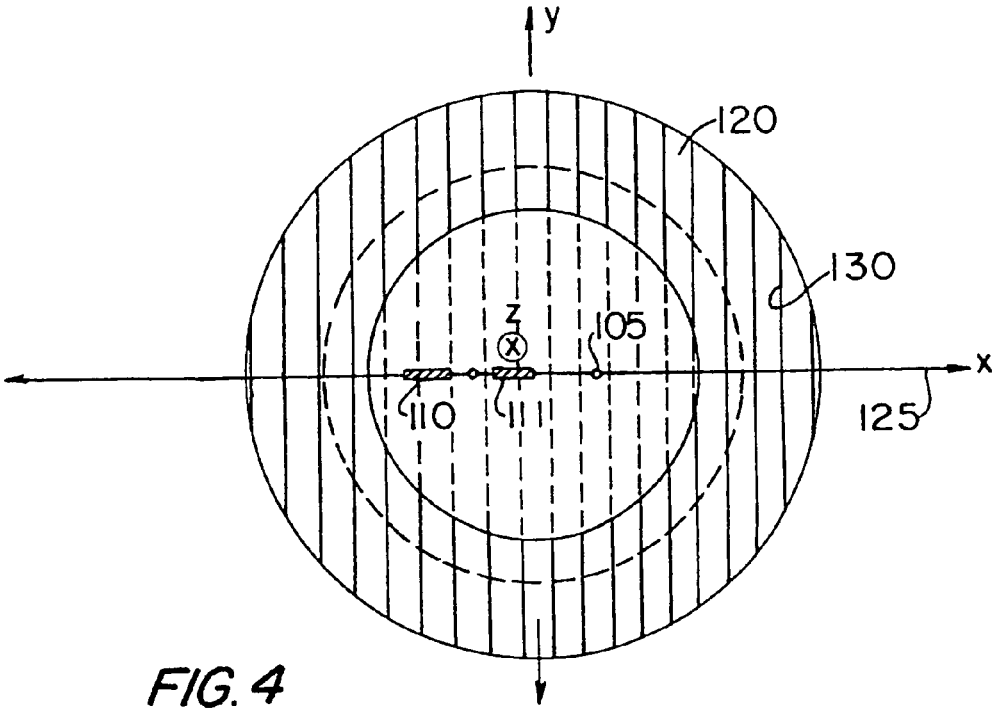
FIG. 4 PRIOR ART
FIG. 4 is an axial view (X-Y plane) of the conventional concentric spectrograph of FIG. 1 taken from line 4-4 of FIG. 3.
Figure 5:
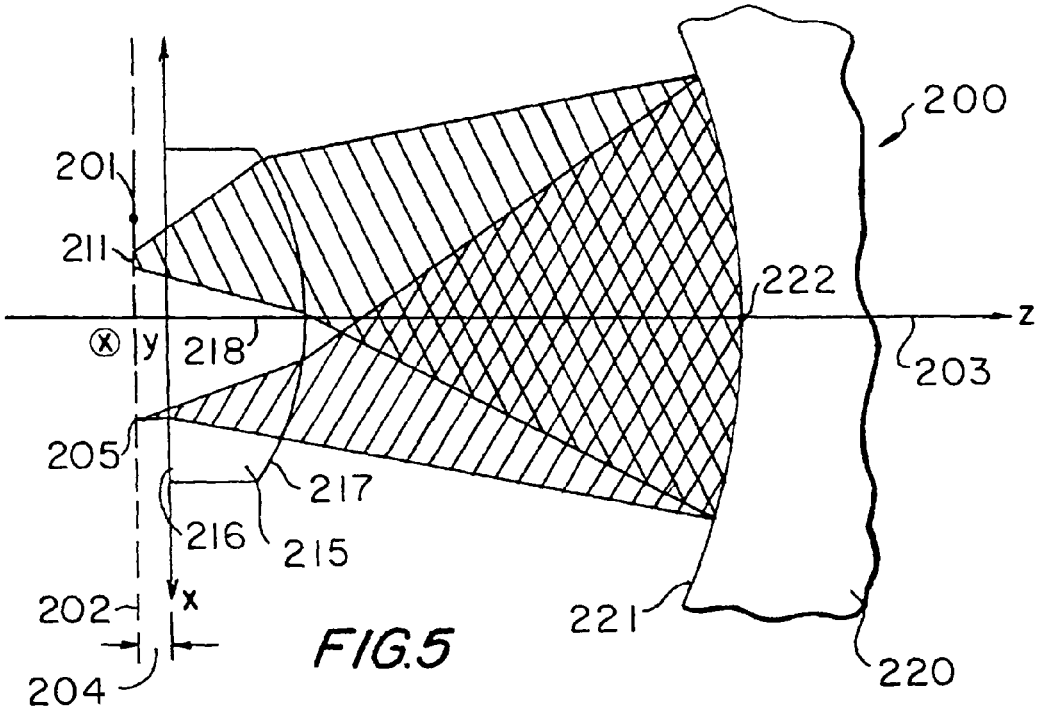
FIG. 5 is a top plan view (X-Z plane) of a preferred embodiment of this invention.
Figure 6:
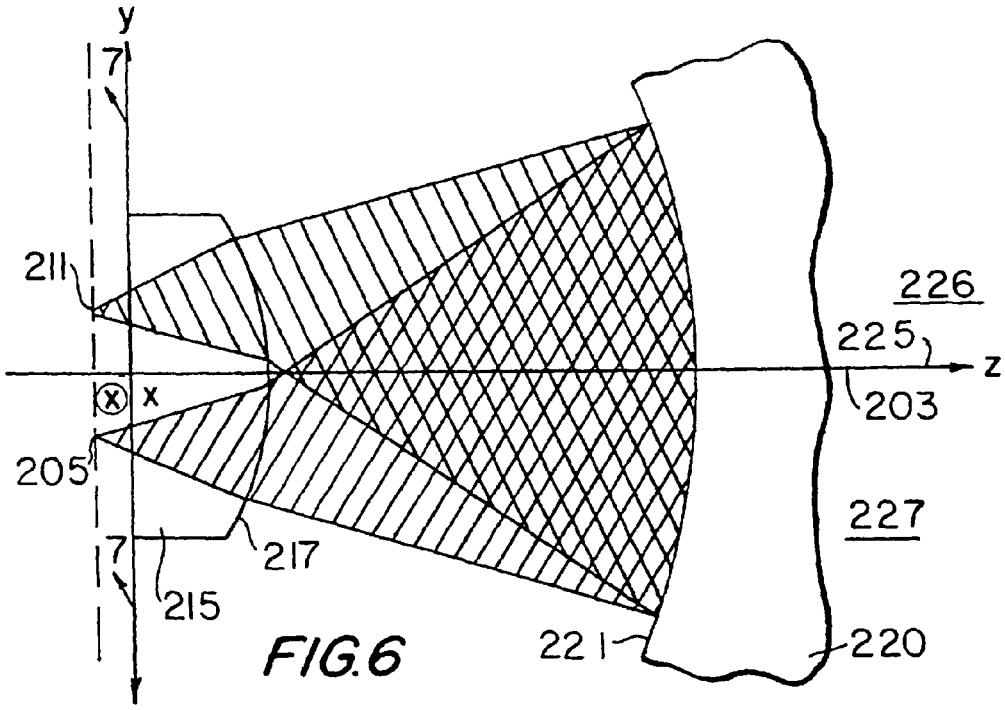
FIG. 6 is a side view (Y-Z plane) of the preferred embodiment of this invention shown in FIG. 5.

As best shown in FIG. 4, entrance port 105 and exit ports 110 and 111 are substantially located in meridian plane 125 of conventional concentric spectrograph 100. This arrangement was believed to maximize throughput and preserve the quality of the image of the diffracted light at exit ports 110 and 111. However, this arrangement, as described more fully below, has the important disadvantage of contaminating desirable diffracted light with stray light at exit port 110. Also, exit ports 110 and 111 are positioned in the meridian plane to receive positive and negative first order diffracted light, respectively. For reasons that will also be more fully described below, the following description concentrates on the use of negative first order light.

As shown best in FIG. 1, polychromatic light propagates in conventional concentric spectrograph 100 along optical path legs 150-155. The optical path begins with leg 150, which begins at entrance port 105 and extends to planar surface 116 of lens 115. As already described above, entrance port 105 is positioned substantially in meridian plane 125. Next, light propagates in lens 115 along leg 151, which extends from planar surface 116 to convex surface 117. Next, light propagates along leg 152, which extends from spherical surface 117 of lens 115 to concave surface 121 of diffraction grating 120.

Figure 9:
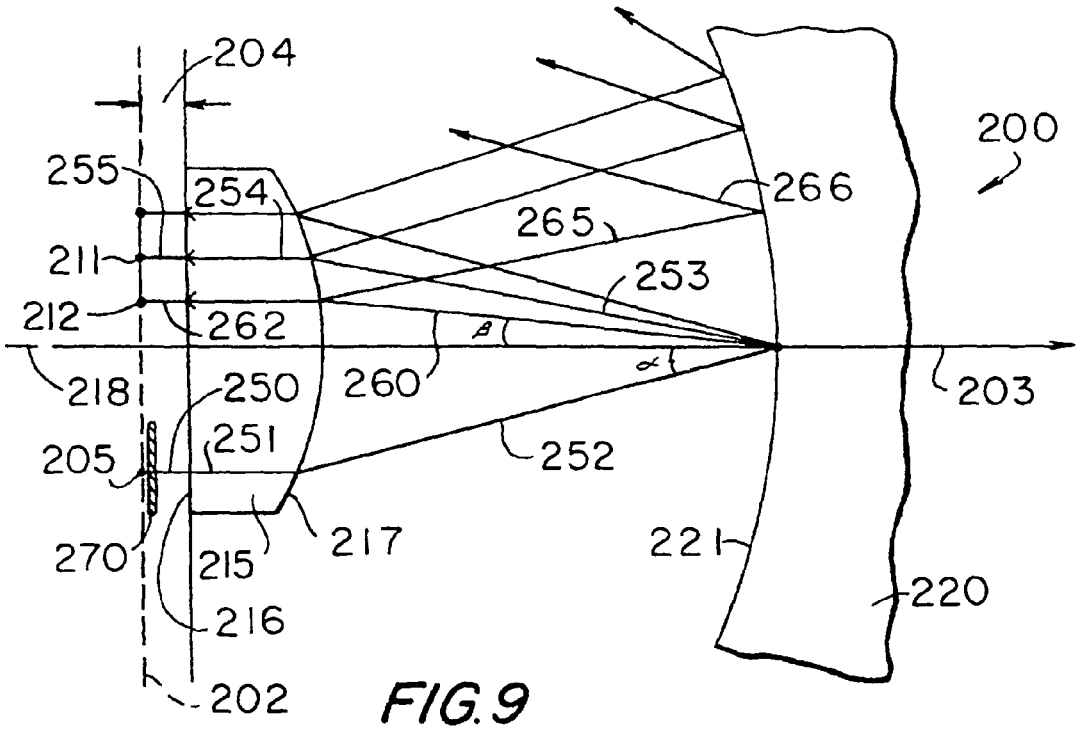
FIG. 9 is a top plan view (X-Y plane) of the modified concentric spectrograph of FIGS. 4-7 of the optical paths of various orders of diffracted light.

When the light is incident on grating surface 121, light is only reflected when the grating equation $kn\lambda=\sin\alpha+\sin\beta$ is satisfied, where $\alpha$ is the angle of incidence, $\beta$ is the angle of diffraction, k is the groove density of the grating, $\lambda$ is the wavelength of the incident light, and where n is the order of the diffracted light (see, e.g., FIG. 9). Zero order light contains all wavelengths that entered entrance port 105, and represents the case when the diffraction grating acts like a mirror. Zero order light is imaged at point 101. Positive and negative order light includes light diffracted by grating 120 that satisfies the grating equation for positive and negative integers, respectively. Positive first order light (i.e., n=1) is imaged at exit port 110 and negative first order light (i.e., n=−1) is imaged at exit port 111. Of course, the position of those ports depends on the particular spectral range of interest.

Conventional concentric spectrograph 100 is normally used with negative or positive first order light for at least two reasons. When the absolute value of the order is small, the intensity of that order is large and the angle of diffraction is small. Large intensities are desirable because it provides more light for subsequent detection. Small angles of diffraction are desirable because astigmatic aberrations are generally minimized. And, because negative first order light is diffracted closer to optical axis 103 than positive first order light for certain wavelengths, aberrations in the spectral image are minimized for those wavelengths. One spectral range of interest is from about 350 nm to about 800 nm. Therefore, according to one embodiment of this invention, negative first order light maximizes intensity and minimizes astigmatic aberrations for this spectral range.

After diffraction by grating surface 121, negative first order light propagates along legs 153-155. First order light propagates along leg 153, which extends from concave surface 121 to convex surface 117. The majority of the first order light incident at convex surface 117 is transmitted through lens 115, along leg 154, which extends from convex surface 117 to planar surface 116. Most first order light that reaches planar surface 116 of lens 115 passes through lens 115 toward exit port 111 along leg 155, which extends between planar surface 116 and exit port 111. Exit port 111 is positioned near primary focal plane 102 of spectrograph 100, so that negative first order light is focused near port 111.

In addition to negative first order, a portion of negative second order light, for example, is focused at exit port 111 in a conventional spectrograph. Therefore, a conventional concentric spectrograph inadequately rejects this portion of stray light. This portion of stray light is focused at the exit port in conventional concentric spectrograph 100 for the following reason.

Figure 8:
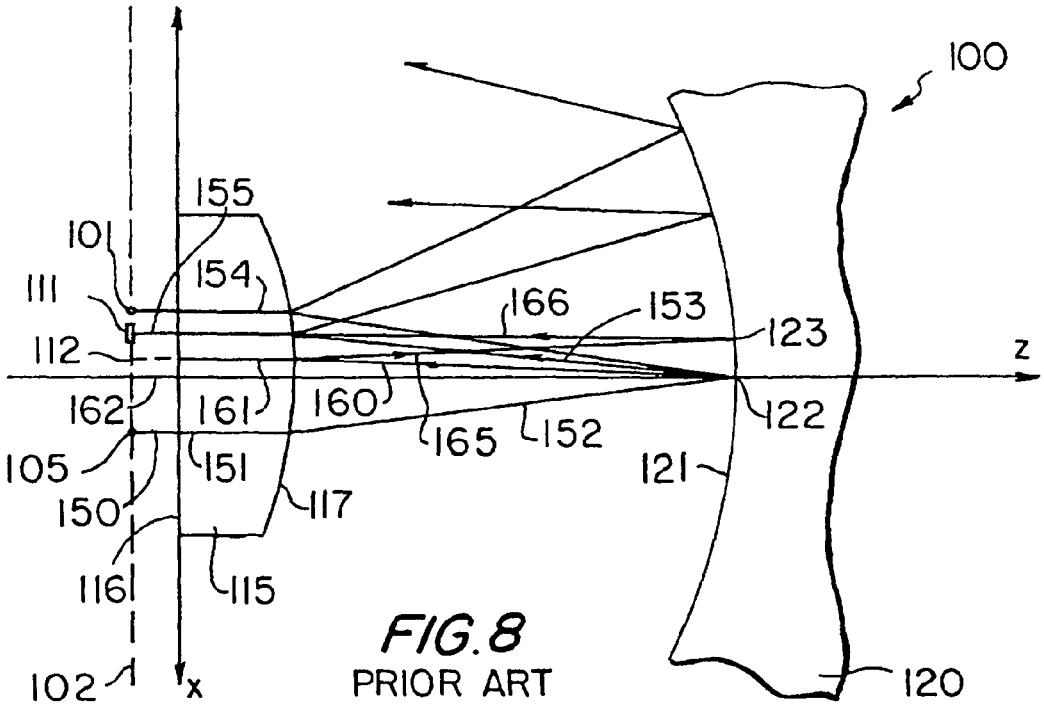
FIG. 8 PRIOR ART
FIG. 8 is a top plan view (X-Y plane) of the conventional concentric spectrograph of FIGS. 1-4 showing the optical paths of various orders of diffracted light.

FIG. 8 shows a ray diagram of a conventional concentric spectrograph, where each ray represents the longitudinal axis of a beam of light (e.g., a diffraction order). Light is reflectively diffracted by grating 120 into several orders and many of these orders are reflected back toward lens 115. In particular, the negative second order propagates along leg 160 toward lens 115. When that order is incident at convex surface 117 of lens 115, a first portion of that order is transmitted through lens 115 and a second portion is reflected by lens 115.

The first portion passes through lens 115 toward planar surface 116 along leg 161. At planar surface 116, that first portion propagates along leg 162 until the light is focused at point 112 in focal plane 102. For certain spectral ranges, point 112 is physically separate from exit port 111 in focal plane 102. Therefore, little mixing occurs between negative first order light that propagates along legs 153-155 and the first portion of negative second order light that propagates along legs 161 and 162.

However, substantial mixing occurs between negative first order light that propagates along legs 153-155 and the second portion of the negative second order light that propagates along legs 165 and 166 at exit port 111. The second portion is reflected back toward grating 121 along leg 165, which extends from convex surface 117 to point 122 on surface 121. As shown in FIG. 8, this second portion reflects from grating surface 121 for a second time toward lens 115 along leg 166. Then, the light passes through lens 115 along leg 154 and toward the focal plane 102 along leg 155, forming an image at exit port 111—the same place that negative first order light forms an image. Therefore, the second portion of negative second order light contaminates the negative first order light at exit port 111 because they both substantially propagate along leg 155 and form an image at the same exit port position.

Light reflected from the surfaces of a light source and a detector may also form an image at the exit port of a conventional concentric spectrograph. For example, as shown in FIG. 8, negative first order light originating from a light source (not shown), such as a luminescing sample surface, propagates along legs 150-155 to exit port 111, where a detector may be mounted for receiving diffracted light. However, the surface of the detector is not completely transmissive and reflects a portion of the light. If the detector surface is normal to the longitudinal axis of the light beam, the reflected portion will retrace its path along legs 150-155, but in a reverse order. When that light reaches the sample surface, it may be reflected for a second time and propagate back along legs 150-155 until it undesirably forms a second image at the exit port. Thus, light which has been reflected from the sample surface also contaminates the exit port in a conventional concentric spectrograph.

In accordance with the present invention, a modified concentric spectrograph is provided that substantially eliminates contamination at the exit port, yet substantially preserves the high image quality there. As best shown in FIGS. 5-7, and 10, modified concentric spectrograph 200 includes at least four optical elements: entrance port 205, exit port 211, lens 215, and concave diffraction grating 220. Optical elements 205, 211, 215, and 220 of modified spectrograph 200 may be identical to optical elements 105, 111, 115, and 120 of conventional concentric spectrograph 100.

The first element is concave diffraction grating 220, which preferably is of the reflective holographic type (such as those available from Instruments S.A., Inc., of Edison, N.J.) Grating 220 has concave grating surface 221, optical axis 203, and meridian plane 225. Meridian plane 225 has two sides. As used herein, the term "side" is the volume that resides above or below meridian plane 225. In other words, one side of meridian plane 225 is the set of points having a positive Y coordinate and the other side is the set of points having a negative Y coordinate. Optical axis 203 of grating 220 passes symmetrically through the center of grating 220 and is normal to surface 221 of grating 220 at point 222. As shown best in FIG. 7, meridian plane 225 includes grating optical axis 203 and is substantially perpendicular to axis 223 of grating lines 224.

The second optical element is lens 215, which preferably has a planar-convex shape, including planar surface 216 and convex surface 217. Lens 215 also has optical axis 218 that passes symmetrically through its center. Although this invention is suitable for use with a lens having an aspherical surface (i.e., when a complementary aspherical grating is used), a lens having a spherical surface is preferred.

The third and fourth optical elements are entrance port 205 and exit port 211, which may be of the fixed or variable slit type (such as those available from Instruments S.A., Inc., of Edison, N.J.). A comparison between conventional concentric spectrograph 100 and modified spectrograph 200 reveals that gratings 120 and 220 and lenses 115 and 225 are arranged in similar fashions. However, entrance port 105 and exit port 205 of conventional concentric spectrograph 100 are arranged differently from the way entrance port 205 and exit port 211 are arranged. In the case of conventional concentric spectrograph 100, entrance port 105 and exit port 111 are substantially located in meridian plane 125 (e.g., the X-Z plane in FIGS. 1-4). In the case of modified spectrograph 200, however, entrance port 205 and exit port 211 are located substantially out and on different sides of meridian plane 225 (e.g., the X-Z plane in FIGS. 5-7).

Figure 7:
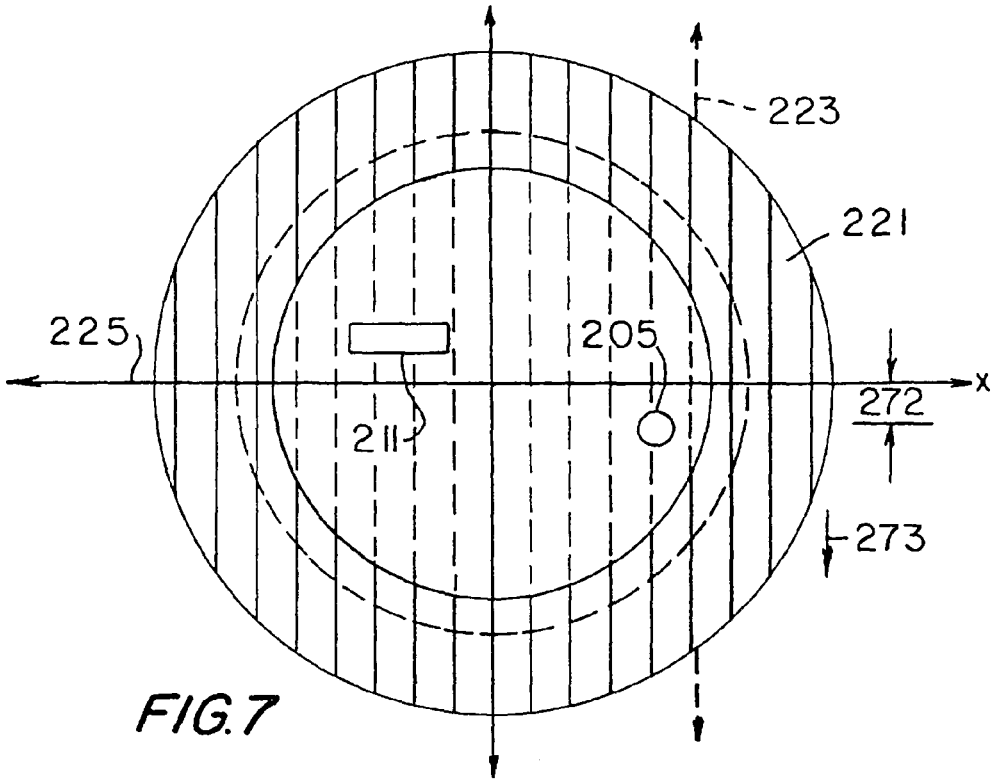
FIG. 7 is an axial view (X-Y plane) of the modified concentric spectrograph of FIG. 6, taken from line 7-7 of FIG. 6.

As shown in FIG. 7, entrance port 205 is positioned at perpendicular distance 272 from meridian plane 225 (X-Z plane) in first direction 273. In other words, entrance port 205 is substantially on one of the two sides of meridian plane 225. Preferably, exit port 275 is also substantially positioned at perpendicular distance 272 from meridian plane 225 in a direction opposite first direction 273, or the other side of plane 225.

An advantage of the arrangement used in modified spectrograph 200 is that no substantial mixing occurs between negative first and second orders at the exit port. This advantage is now explained with reference to FIGS. 8, 9, and 12.

First, the exit port should be placed in a position that receives an order of light that maximizes throughput and minimizes astigmatism. When the absolute value of the order is small, the intensity of that order is large and the angle of diffraction is small. A large intensity is desirable because it provides more light for subsequent detection. A small angle of diffraction is desirable because astigmatic aberrations are minimized. Therefore, lower orders are more preferable than higher orders for detection purposes, and first order is most preferable.

Figure 12:
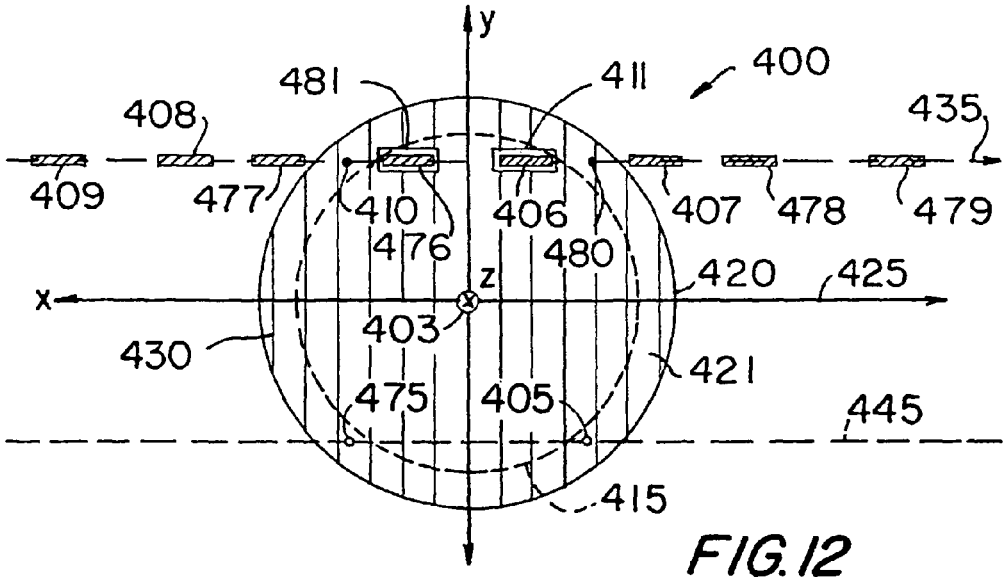
FIG. 12 is an axial view (X-Y plane) of an embodiment of a modified concentric spectrograph according to the present invention with two entrance ports and two exit ports.

Furthermore, negative first order is more advantageous than positive first order because the negative first order is imaged even closer to the optical axis of the lens than positive first order, thereby further minimizing astigmatic aberrations in the image. The positions of spectra of different diffraction orders are best shown in FIG. 12. First entrance port 405 (which corresponds to entrance port 205 in FIG. 4) produces multiple diffraction order spectra along axis 435 (the Z axis) in a focal plane of the spectrograph (an X-Y plane). These spectra include negative first and second orders 406 and 407, positive first and second orders 408 and 409, and zero order 410. Entrance port 405 and its corresponding zero diffraction order 410 are symmetrically positioned on opposite sides of optical axis 403 in the primary focal plane. An important feature of the spectra shown in FIG. 12 is that negative first order spectrum 406 is imaged substantially closer to optical axis 403 than positive first order spectrum 408. Therefore, negative first order spectrum 406 will be more anastigmatic than positive first order spectrum 408. For this reason, modified concentric spectrograph 200 preferably has an exit port positioned near a focal plane of the spectrograph, such as planar surface 202, to receive negative first order light. However, an exit port could be positioned to receive any non-zero order of diffracted light in accordance with the principles of this invention.

Second, as shown in FIG. 9, polychromatic light preferably enters modified spectrograph 200 through entrance port 205 along leg 250. As described above, entrance port 205 is located out of meridian plane 225. The light then passes through lens 215 along leg 251, which extends from planar surface 216 to convex surface 217. Optical, axis 218 of lens 215 is preferably substantially coaxial with optical axis 203 of grating 220. However, optical axis 218 may be parallel to and offset from optical axis 203, when such a position improves the image quality or further reduces stray light at exit port 211. Lens 215 is also preferably positioned so that its convex surface 217 is substantially concentric with concave surface 221 of grating 220. Then, lens 215 directs the light propagating along leg 251 toward concave surface 221 along leg 252, which extends from convex surface 217 to concave surface 221. When these optical components are positioned appropriately, that light at least partially fills concave surface 221. When the light is incident on grating surface 221, the light is diffracted by it, producing multiple orders of diffracted light.

As also shown in FIG. 9, negative first order light propagates along legs 253-255 in modified spectrograph 200, analogous to legs 153-155 in conventional concentric spectrograph 100. After diffraction, negative first order light propagates along leg 253, which extends from concave surface 221 to convex surface 217 of lens 215. Most first order light is transmitted through lens 215 along leg 254, which extends from convex surface 217 to planar surface 216. After reaching surface 216, most first order light passes out of lens 215 toward exit port 211 along leg 255, which extends between planar surface 216 and exit port 211. Exit port 211 is preferably positioned near focal plane 202 to receive the first order light.

In addition to negative first order light, negative second order light is reflectively diffracted toward lens 215 along leg 260, which extends from concave surface 221 to convex surface 217. A portion of the negative second order light that reaches convex surface 217 passes through lens 215 toward planar surface 216 along leg 261. At planar surface 216, the negative second order light propagates along leg 262 until the light is focused at region 212 near focal plane 202. Region 212 is physically removed from exit port 211. Therefore, like in a conventional concentric spectrograph, negative first order light does not substantially mix with negative second order light which was reflectively diffracted once.

However, unlike in a conventional concentric spectrograph, negative first order light does not substantially mix with negative second order light that has been reflectively diffracted twice at the exit port for the following reason.

In conventional concentric spectrograph 100 (e.g., shown in FIG. 8), as already described above, some negative second order light is diffracted twice by concave surface 117 at points 122 and 123 and directed toward exit port 111. However, in modified spectrograph 200 (as shown in FIG. 9), negative second order light that is diffracted twice is not directed toward exit port 211. That is, in modified spectrograph 200, negative second order light that has been reflectively diffracted twice by grating 220 propagates along leg 266, but that light is not imaged at the same exit port at which the desired spectra is imaged. In fact, the light which has been reflectively diffracted twice may not even reach convex surface 217 for a second time. Rather, the light propagating along leg 266 is directed at a different position on surface 217 of lens 215, or at an internal surface of the housing, for example, so that that light is not focused toward exit port 211. This result is certain when leg 252, which extends toward grating 225, and legs 253 and 260, which extend from grating 225, are not parallel to or lie substantially in meridian plane 225. That light may then be absorbed by an absorbing surface to ensure that it is not internally reflected within spectrograph 200 back toward exit port 211.

Because this portion of negative second order light is not directed to the same place on convex surface 217 as negative second order light, that portion cannot be focused at exit port 211. Therefore, in the case of modified spectrograph 200, negative first and second orders do not substantially mix at exit port 211.

Figure 10:
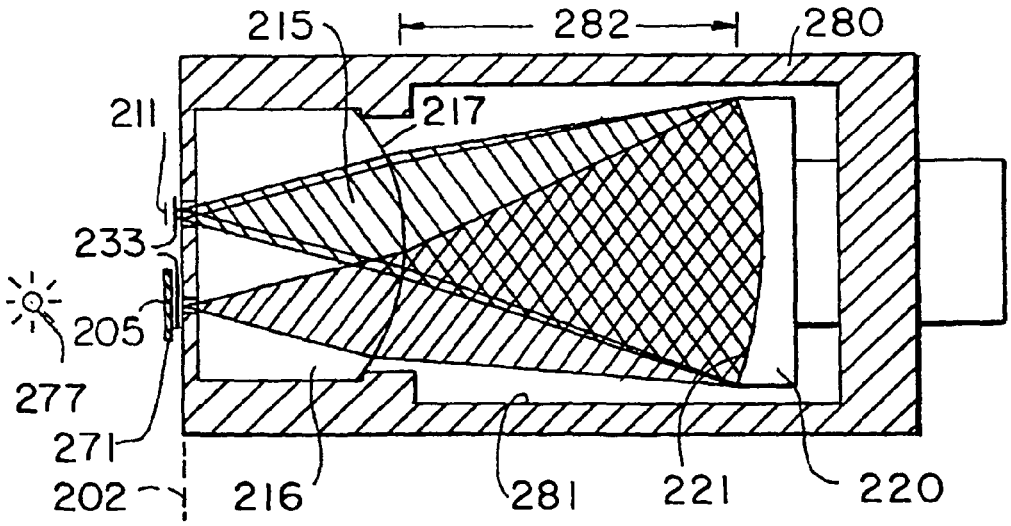
FIG. 10 is a top plan view (X-Z plane) of a preferred embodiment of a modified concentric spectrograph according to the present invention with an entrance port positioned at one end of the spectrograph.

One embodiment of the present invention is shown in FIG. 10. Grating 220 has a concave spherical grating surface 221 that has a radius of curvature of about 250 mm and a diameter of about 130 mm. Lens 215 has a radius of curvature of about 94 mm and has a diameter of about 110 mm. Distance 282 between convex surface 217 and concave surface 221 is about 155 mm. Such an embodiment is particularly well suited for dispersing wavelengths between about 350 nm and about 800 nm and has an F-number of about 1.3. Of course, a person of ordinary skill in the art of optical spectroscopy could adjust these parameters for other spectral ranges.

Although this invention makes filters less necessary, filters may be used with modified spectrograph 200 to further reduce stray light at exit port 211. One or more optical filters 270 may be placed between lens 215 and ports 205 or 220 (e.g., FIG. 9). One or more optical filters 271 may also be positioned between light source 277 and entrance port 205 (e.g., FIG. 10) to prevent light from any secondary light sources that may otherwise enter entrance port 205. Furthermore, one or more optical filters 370 may also be placed between lens 315 and optical block 390 or prism 391 (e.g., FIG. 11). In accordance with this invention, filters may be used as long as the changes to the optical path lengths at both ports remain within the design constraints of the spectrograph.

Entrance port 205 preferably has a symmetric shape and a small size. The shape may be round, but could be square, polygonal, or any other shape useful for a particular spectroscopic application, including an elongated rectangle (e.g., a slit). Exit port 211 preferably has an elongated shape, preferably rectangular, having a longitudinal axis that is parallel to meridian plane 225. The size and shape of entrance port 205 and exit port 211 could also be variable, using any variable port device (such as the one available as Part No. 220ASLN from Instruments S.A., Inc., of Edison, N.J.).

A spectrograph according to the present invention may further include a housing. As shown in FIG. 10, housing 280 encloses grating 220 and lens 215. Entrance port 205 and exit port 211 may also be mounted to housing 280. Housing 280 reduces undesirable stray light from contaminating the polychromatic light inside housing 280 by preventing stray light from entering housing 280. Unfortunately, inner surface 281 of housing 280 may undesirably reflect light toward exit port 211, but this undesirable effect can be minimized by making surface 281 absorptive, such as by making the surface dark. Another way that surface 281 may be made absorptive is by providing the surface with a grooved, or buttress threaded texture.

In accordance with this invention, the entrance and exit ports may be placed in a variety of positions on their respective sides of the meridian plane. For example, FIG. 10 shows an embodiment of this invention in which primary focal plane 202 is located optical length 203 from planar surface 216 of lens 215. In this embodiment, entrance port 205 and exit port 211 are both located near primary focal plane 202.

Figure 11:
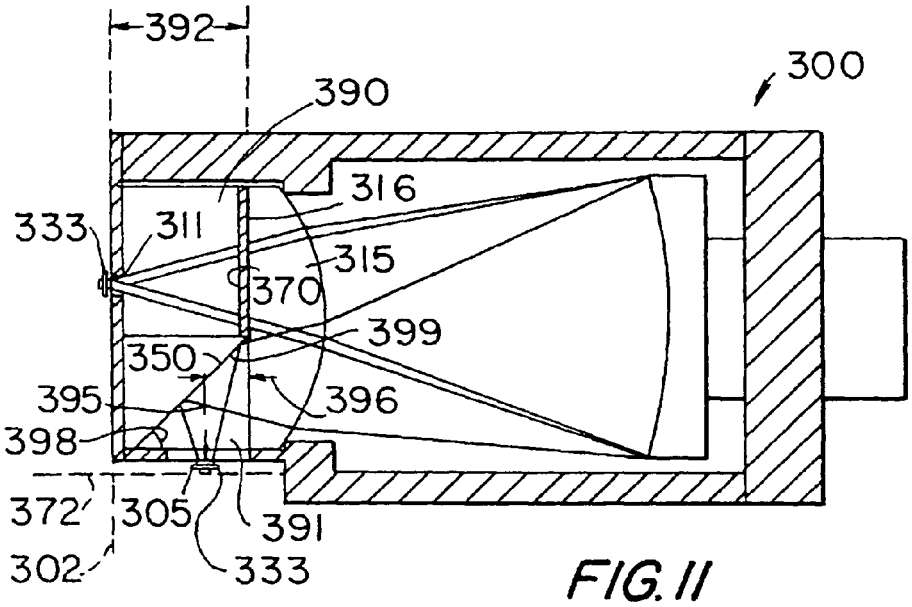
FIG. 11 is a top plan view (X-Z plane) of another preferred embodiment of a modified concentric spectrograph according to the present invention with the entrance port positioned on the side of the spectrograph.

However, either port may be positioned in or near a modified focal plane. For example, FIG. 11 shows exit port 311 near focal plane 302 and entrance port 305 near modified focal plane 372. Entrance port 305 is now more physically remote from exit port 311, which provides more space at ports 305 and 311 for mounting additional optical instrumentation, such as large optical detectors, cryostats, etc.

One way in which the entrance port may be added or moved to a modified focal plane is by the addition of reflective surface 350 between the primary focal plane 302 and lens 315, which is usually between the primary entrance port and the lens. Reflective surface 350 could be fixed in the spectrograph or removable, which allows a user to select a primary or secondary port. However, it should be understood by a person of ordinary skill in the art that the addition of reflective surface 350 does not require the presence of primary port. Reflective surface 350 may be provided in a number of ways. One such way is by the addition of optical block 390 and optical prism 391.

Optical prism 391 is preferably formed from optically transmissive material, such as glass, and has reflective surface 350 disposed on a planar surface thereof. Optical prism 391 preferably has the shape of a right triangle, so that the value of angles 398 and 399 are about 45 degrees. Optical block 390 is also preferably formed from an optically transmissive material, possibly from the same material which optical prism 391 and lens 315 is formed. When optical prism 391 and optical block 390 are made from the same material, optical length 392 and the sum of optical lengths 395 and 396 are substantially the same when the physical lengths are substantially the same. The index of refraction of the optically transmissive materials will in part determine the effective focal length of the lens and spectrograph. When the index of refraction is relatively large, the effective focal lengths at the entrance and exit ports of the spectrograph are extended. Optical length 392 corresponds to the distance between exit port 311 and planar surface 316. The sum of optical lengths 395 and 396 corresponds to the distance between entrance port 305 and planar surface 316. When optical length 392 and sum of optical lengths 395 and 396 are substantially the same, modified spectrograph 300 can provide high quality images at high resolution with excellent stray light rejection at exit port 311. Of course, in accordance with this invention, entrance port 205 and exit port 211 can be positioned on the same side of meridian plane 225 using one or more reflective surfaces.

In accordance with another aspect of the present invention, one or more optically transmissive plates that have a large index of refraction may be placed in the optical path of the spectrograph, in addition to the optical block and the optical prism, to further adjust the effective focal length of the lens. For example, in the embodiment shown in FIG. 10, optically transmissive plates 233 may be placed between ports 205 or 211 and lens 215. Also, in the embodiment shown in FIG. 11, optically transmissive plates 333 may be placed between: (1) optical prism 391 and lens 315 or entrance port 305, as well as between (2) optical block 390 and lens 315 or exit port 311. One optically transmissive material that has a large index of refraction is sapphire.

Figure 13:
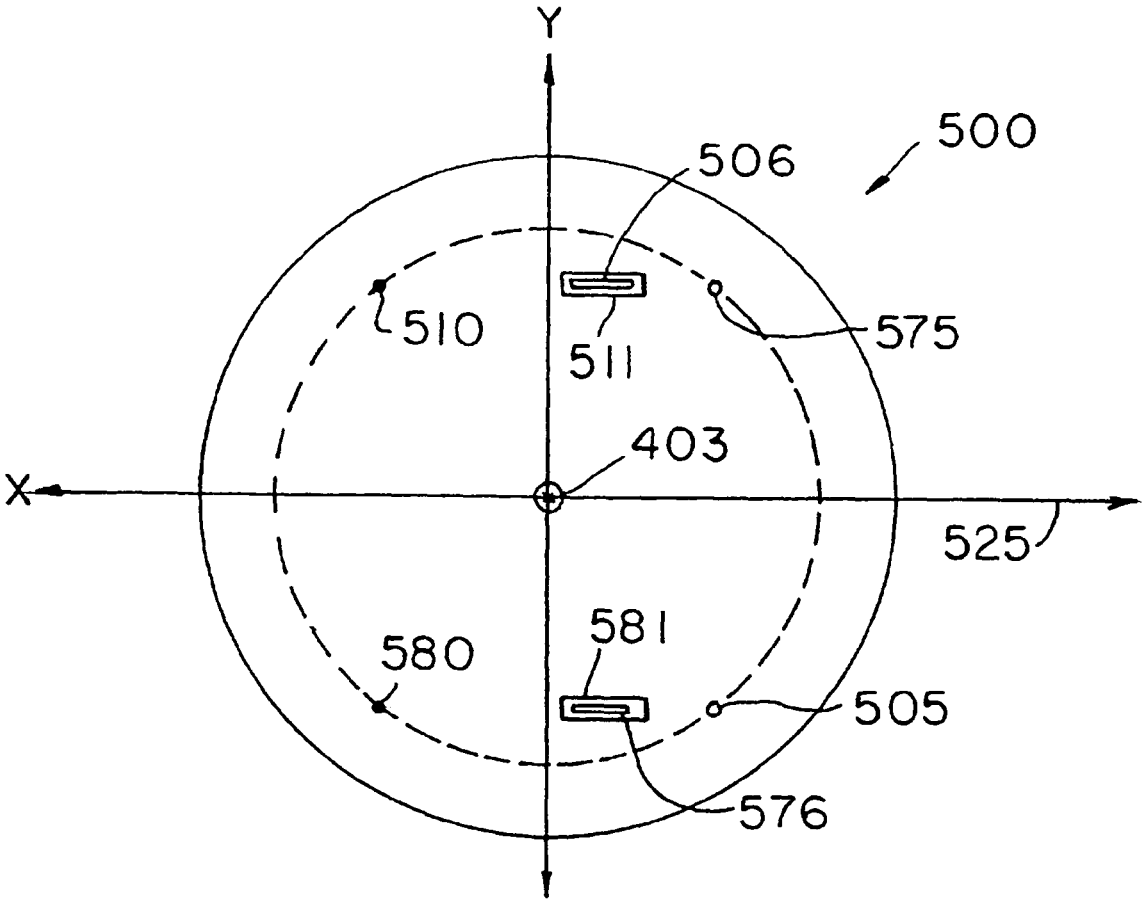
FIG. 13 is an axial view (X-Y plane) of another embodiment of a modified concentric spectrograph according to the present invention with two entrance ports and two exit ports.

Further according to the principles of this invention, a modified concentric spectrograph having at least two entrance ports and two exit ports is also provided. FIGS. 12 and 13 show optical axial views (along the Z axis) of spectrographs 400 and 500, each of which have two pairs of entrance and exit ports. As explained more fully below, both pairs of ports on each instrument are similar to the single pair of ports shown in spectrograph 200 of FIG. 7.

For example, modified concentric spectrograph 400, shown in FIG. 12, includes grating 420, lens 415, primary entrance port 405, primary exit port 411, secondary entrance port 475, and secondary exit port 481. Grating 420 has an intrinsic optical axis 403, meridian plane 425, and real concave surface 421. Preferably, grating surface 421 is spherically shaped. Grating 420 has grating lines 430, which are oriented in a direction substantially perpendicular to meridian plane 425. Lens 415 is the same as lens 215, and therefore has a substantially planar surface, a convex surface, and optical axis 403. The convex surface of lens 415 faces the concave surface of grating 420. The optical axes of grating 420 and lens 415 are substantially coaxial, and the primary focal plane of spectrograph 400 is formed perpendicular to optical axis 403 and faces the planar surface of lens 415. In other words, spectrograph 400 is substantially similar to spectrograph 200, except that spectrograph 400 also has secondary entrance and exit ports 411 and 481, respectively.

As in spectrograph 200, each pair of ports lies substantially on different sides of the meridian plane. As explained more fully above, this modified arrangement requires that a majority of the cross-sectional area of an entrance port lie on a different side of the meridian plane from its complementary exit port. In one embodiment, the entire cross-sectional area of each of port lies entirely on different sides of the meridian plane. For example, as shown in FIG. 12, entrance and exit ports 405 and 411 are on different sides of meridian plane 425. Also, entrance and exit ports 475 and 481 are on different sides of meridian plane 425.

When a spectrograph has two or more pairs of ports, the entrance port of one pair may be on different sides or the same side as an exit port of another pair. For example, one embodiment of modified concentric spectrograph 400 is shown in FIG. 12. Spectrograph 400 has two entrance ports 405 and 475 on one side of meridian plane 425 and corresponding exit ports 411 and 481 on the other side of meridian plane 425. Another embodiment of modified concentric spectrograph 500 is shown in FIG. 13. Spectrograph 500 has one entrance port and one exit port on each side of meridian plane 525. Both of these embodiments are described below.

Spectrograph 400 is generally constructed in a fashion similar to spectrograph 200 so that exit ports 411 and 481 are positioned to receive an image of entrance ports 405 and 475 using first order light, although other orders may be used. In order to minimize astigmatism, the preferred order is the order imaged closest to the optical axis of the lens. Negative first order spectra 406 and 476 is shown imaged in exit ports 411 and 481, respectively. In addition to negative first order spectra 406 and 476, positive first order spectra 408 and 478, positive second order spectra 409 and 479, and negative second order spectra 407 and 477, which correspond to entrance ports 405 and 475, respectively, are shown in FIG. 12. Zero order images 410 and 480 of entrance ports 405 and 475, respectively, are also shown. One advantage of spectrograph 400 is that a single detector may be used to monitor the spectra of two different inputs, such as a sample and a reference. The use of a single detector can be especially useful for normalization and other calibration procedures.

As shown in FIG. 13, spectrograph 500 is constructed in a fashion similar to spectrographs 200 and 400 so that exit ports 511 and 581 are positioned to receive an image of entrance ports 505 and 575, respectively. The main difference between spectrograph 400 and spectrograph 500 is that entrance ports 505 and 575 of spectrograph 500 are on different sides of meridian plane 525. An advantage of spectrograph 500 over spectrograph 400 is that exit ports 511 and 581 are a larger distance from one another, thereby providing additional space for mounting detection equipment and allows for the use of two separate detectors. As shown in FIG. 13, negative first order spectra 506 and 576 are focused at exit ports 511 and 581, respectively. Zero order images 510 and 580 of entrance ports 505 and 575, respectively, are also shown in FIG. 13. Also, in accordance with this invention, the number of pairs of ports can be substantially greater than two and is only limited by the width of each spectra.

Like spectrograph 200, spectrograph 400 may include a housing (not shown) in which grating 400 and lens 415 are placed and wherein at least one of ports 405, 475, 411, and 481 is mounted. And, the ports are preferably located near a focal plane of the spectrograph. As with concentric spectrographs generally, the convex surface of lens 415 and the concave surface of grating 420 are preferably substantially concentric.

A method for using a spectrograph built in accordance with the principles of the present invention is also provided. In a first step, polychromatic light passes through an entrance port located at a perpendicular distance from the meridian plane of a concave diffraction grating. In a second step, the light is directed using a lens toward a concave grating surface of the grating so that the light is incident on the grating surface at least in the meridian plane. In a third step, the light is diffracted by the diffraction grating. In a fourth step, the diffracted light is imaged with the same lens at the an exit port which is also located out of the meridian plane.

A method for diffracting two beams of light using a multiport spectrograph, such as the one shown in FIG. 12, is also provided. The beams may be diffracted simultaneously or alternatively. As already described above, the spectrograph includes a grating, a lens, a primary entrance port, a primary exit port, a secondary entrance port, and a secondary exit port.

In a first step, a first polychromatic light beam is diffracted. The first polychromatic light beam is diffracted by (1) providing said first polychromatic beam at the primary entrance port, (2) directing the first polychromatic beam with the lens toward the grating so that the first polychromatic beam is incident on the grating in the meridian plane, (3) reflecting the first polychromatic beam with the grating to form a first diffracted beam; and imaging the first diffracted beam with the lens at the primary exit port.

And, in a second step, during or alternating with the first step, a second polychromatic light beam is diffracted. The second light beam is diffracted by (1) providing the second beam at the secondary entrance port, (2) directing the second beam with the lens toward the grating so that the second beam is incident on the grating, (3) reflecting the second beam with the grating to form a second diffracted beam, and (4) imaging the second diffracted beam with the lens at the secondary exit port.

Thus, a modified concentric spectrograph with improved stray light rejection is provided. One skilled in the art will appreciate that the present invention can be practiced by other than the described embodiments, which are presented for purposes of illustration and not of limitation, and the present invention is limited only by the claims which follow.

What is claimed is:

1. A modified concentric spectrograph comprising:

a grating having an optical axis, a meridian plane, and a concave surface, said meridian plane having a first side and a second side;

a lens having a substantially planar surface, a convex surface, and an optical axis, wherein said convex surface is facing said concave surface, said optical axes being substantially coaxial;

a primary entrance port being located substantially out of said meridian plane toward said first side; and a primary exit port being located substantially out of said meridian plane toward said second side for receiving an order of light that maximizes throughput and minimizes astigmatism.

2. The spectrograph of claim 1 wherein at least one of said primary ports is near said planar surface of said lens.

3. The spectrograph of claim 1 wherein said primary entrance port has a cross-sectional area, and wherein a majority of said cross-sectional area is on said first side of said meridian plane.

4. The spectrograph of claim 1 wherein said primary entrance port has a center, and wherein said center is on said first side of said meridian plane.

5. The spectrograph of claim 3 wherein said primary exit port has a cross-sectional area, and wherein a majority of said cross-sectional area is on said second side of said meridian plane.

6. The spectrograph of claim 1 wherein said primary exit port has a center, and wherein said center is on said second side of said meridian plane.

7. The spectrograph of claim 1 wherein said primary entrance port and said primary exit port are located at substantially the same perpendicular distance from said meridian plane.

8. The spectrograph of claim 1 wherein:

said entrance port is for receiving polychromatic light from a source, said spectrograph further comprising:

a housing for preventing stray light from contaminating said polychromatic light in said housing.

9. The spectrograph of claim 1 further comprising at least one optical filter positioned near one of said ports.

10. The spectrograph of claim 1 further comprising at least one optical filter positioned between one of said ports and said planar surface of said lens.

11. The spectrograph of claim 1 further comprising:

a secondary entrance port; and a reflective surface between said primary entrance port and said lens.

12. The spectrograph of claim 11 wherein said reflective surface is planar and has an axis normal to said reflective surface, said axis forming an angle with said grating optical axis, said angle being about 45°.

13. The spectrograph of claim 1 further comprising:

a secondary exit port; and a reflective surface between said primary exit port and said lens.

14. The spectrograph of claim 13 wherein said reflective surface is planar and has an axis normal to said reflective surface, said axis forming an angle with said grating optical axis, said angle being about 45°.

15. A modified concentric spectrograph comprising:

a grating having an optical axis, a meridian plane, and a concave surface;

a lens having a substantially planar surface, a convex surface, and an optical axis, wherein said convex surface is facing said concave surface, said lens optical axis is substantially coaxial with said grating optical axis, and a primary focal plane is formed perpendicular to said optical axis facing said planar surface of said lens;

a primary entrance port near said primary focal plane at an intersection between a first axis and a second axis, wherein said first axis is parallel to, and offset in a first direction from, said meridian plane and said second axis is perpendicular to said meridian plane and offset from said optical axis; and a primary exit port near said primary focal plane located at a second perpendicular distance from said meridian plane, in a second direction opposite said first direction for receiving an order of light that maximizes throughput and minimizes astigmatism.

16. The spectrograph of claim 15 wherein said entrance port is for receiving light and wherein said grating diffracts said light into at least one non-zero diffraction order, said exit port being positioned along said first axis to receive a portion of said non-zero diffraction order.

17. The spectrograph of claim 16 wherein said non-zero order is an order which is imaged most closely to said optical axis.

18. The spectrograph of claim 16 wherein said non-zero order is a negative first order.

19. The spectrograph of claim 15 wherein said exit port is elongated along said first axis.

20. The spectrograph of claim 15 further comprising at least one optical filter positioned between one of said ports and said lens.

21. The spectrograph of claim 15 wherein said entrance port is for receiving light from a primary light source, said spectrograph further comprising at least one optical filter between said light source and said entrance port.

22. The spectrograph of claim 15 wherein said entrance port is for receiving light from a primary light source, said spectrograph further comprising a housing for preventing light coming from a secondary light source external to said housing from contaminating said light from said primary source in said housing.

23. The spectrograph of claim 22 wherein at least one of said ports is mounted to said housing.

24. The spectrograph of claim 15 further comprising:

a secondary entrance port; and a reflective surface between said primary entrance port and said lens, wherein said reflective surface forms a modified focal plane in which said secondary entrance port is located.

25. The spectrograph of claim 15 further comprising a first body comprising an optically transmissive material, said transmissive material having an index of refraction, said first body having at least three planar surfaces, wherein any pair of said first body planar surfaces intersect to form a respective line of intersection, each respective line of intersection being substantially parallel to the other lines, a first of said first body planar surfaces being at least partially located between said primary entrance port and said lens and having a reflective surface disposed on said first plane forming a modified focal plane, a second of said first body planar surfaces facing said planar surface of said lens, and a third of said first body planar surfaces facing said modified focal plane.

26. The spectrograph of claim 25 further comprising a second body comprising said optically transmissive material, said second body having at least two substantially parallel planar surfaces, a first of said second body parallel planar surfaces facing said primary exit port, a second of said second body parallel planar surfaces facing said lens.

27. The spectrograph of claim 25 wherein an angle between said optical axis of said grating and an axis normal to said first of said first body planar surfaces is about 45°.

28. The spectrograph of claim 27 wherein said second surface of said first body is fixedly attached to said planar surface of said lens.

29. The spectrograph of claim 25 further comprising at least one optical filter positioned between said lens and said first body.

30. The spectrograph of claim 26 further comprising at least one optical filter positioned between said lens and said second body.

31. The spectrograph of claim 26 wherein said second surface of said second body is fixedly attached to said planar surface of said lens.

32. The spectrograph of claim 31 further comprising an adhesive having an index of refraction that is substantially the same as the index of refraction of said second body for fixedly attaching said second body to said lens.

33. The spectrograph of claim 26 wherein said second surface of said second body and said lens are integral.

34. The spectrograph of claim 25 further comprising a secondary exit port and a reflective surface between said primary exit port and said lens, wherein said reflective surface forms a modified focal plane.

35. The spectrograph of claim 15 further comprising a first body comprising an optically transmissive material, said optically transmissive material having an index of refraction, said first body having at least three planar surfaces, wherein any pair of said first body planar surfaces intersect to form a respective line of intersection, each respective line of intersection being substantially parallel to the other lines, a first of said planes being located between said primary exit port and said lens and having a reflective surface disposed on said first plane, thereby forming a modified focal plane, a second of said first body planar surfaces facing said lens planar surface, and a third of said first body planar surfaces facing said modified focal plane.

36. The spectrograph of claim 35 further comprising a second body comprising said optically transmissive material, said second body having at least two substantially parallel planar surfaces, a first of said second body parallel planar surfaces facing said primary entrance port, a second of said second body parallel planar surfaces facing said lens.

37. The spectrograph of claim 35 wherein an angle between said optical axis of said grating and an axis normal to said first of said reflective surface is about 45°.

38. The spectrograph of claim 35 wherein said second surface of said first body is fixedly attached to said planar surface of said lens.

39. The spectrograph of claim 35 further comprising at least one optical filter positioned between said lens and said first body.

40. The spectrograph of claim 36 further comprising at least one optical filter positioned between said lens and said second body.

41. The spectrograph of claim 36 wherein said second face of said second body is fixedly attached to said planar surface of said lens.

42. The spectrograph of claim 41 further comprising an adhesive having an index of refraction that is substantially the same as the index of refraction of said second body for fixedly attaching said second body to said lens.

43. The spectrograph of claim 35 wherein said second body and said lens are integral.

44. The spectrograph of claim 15 wherein at least one of said ports is substantially in one of said focal planes.

45. The spectrograph of claim 15 wherein said convex surface has a center of curvature and said concave surface has a center of curvature, and wherein said centers of curvature are substantially concentric.

46. A modified concentric spectrograph with reduced stray light, said spectrograph comprising:

a concave grating for dispersing light having an optical axis, a meridian plane, and a concave surface;

a lens having an optical axis, a planar surface, and a convex surface, wherein said optical axes are substantially coaxial, said convex surface is facing said concave surface, and wherein a primary focal plane is formed facing said planar surface of said lens;

an entrance port near said focal plane for permitting light to enter said spectrograph along an optical path, said entrance port being substantially located at a distance from said meridian plane in a first direction, said lens directing said light from said entrance port toward said meridian plane and said grating surface for diffraction; and an exit port located near said focal plane for permitting a portion of said light to exit said spectrograph after said light is diffracted by said grating, said lens imaging said portion of said light at said exit port for receiving an order of light that maximizes throughput and minimizes astigmatism.

47. The spectrograph of claim 46 wherein said entrance port and said exit port are optically connected by an optical path.

48. The spectrograph of claim 46 wherein at least some of said portion of said light is a non-zero order of diffracted light.

49. The spectrograph of claim 48 wherein said non-zero order of diffracted light is an order that is imaged most closely to said grating optical axis at said focal plane.

50. The spectrograph of claim 48 wherein said non-zero order is a negative first order.

51. The spectrograph of claim 46 wherein said exit port is at said perpendicular distance from said meridian plane in a direction opposite said first direction.

52. The spectrograph of claim 46 wherein said lens has an optical axis that is parallel to and offset from said grating optical axis to improve image quality and reduce stray light at said exit port.

53. The spectrograph of claim 46 further comprising a housing in which said lens and said grating are placed, said housing for preventing light coming from any secondary light source outside said housing from contaminating said light in said housing.

54. The spectrograph of claim 46 further comprising:

a reflective surface between said entrance port and said lens, thereby forming a modified focal plane; and a secondary entrance port near said modified focal plane for receiving light from a light source.

55. The spectrograph of claim 46 further comprising:

a reflective surface between said exit port and said lens, thereby forming a modified focal plane; and a secondary exit port near said modified focal plane for permitting dispersed light to exit said spectrograph.

56. The spectrograph of claim 46 wherein said primary entrance port and said primary exit port are located near a primary focal plane near said planar surface of said lens.

57. The spectrograph of claim 46 wherein said convex surface has a center of curvature and said concave surface has a center of curvature that is substantially concentric with said convex surface center.

58. A modified concentric spectrograph comprising:

a grating having an optical axis, a meridian plane, and a concave surface;

a lens having a substantially planar surface, a convex surface, and an optical axis, wherein said convex surface is facing said concave surface, said optical axes are substantially collinear and said surfaces are substantially concentric, and a primary focal plane is formed perpendicular to said optical axis facing said planar surface of said lens;

a primary entrance port near said primary focal plane at an intersection between a first primary axis and a second primary axis, wherein said first primary axis is parallel to and offset from said meridian plane and said second primary axis is perpendicular to said meridian plane and offset from said grating optical axis;

a primary exit port near said primary focal plane located at a first perpendicular distance from said meridian plane, said first perpendicular distance being in a second direction opposite said first direction for receiving an order of light that maximizes throughput and minimizes astigmatism;

a secondary entrance port near said primary focal plane at an intersection between a first secondary axis and a second secondary axis, wherein said first secondary axis is parallel to and offset from said meridian plane and said second secondary axis is perpendicular to said meridian plane and offset from said grating optical axis; and a secondary exit port near said primary focal plane located at a second perpendicular distance from said meridian plane in said second direction.

59. The spectrograph of claim 58 wherein said primary entrance port is positioned to receive polychromatic light and wherein said grating diffracts said light into at least one non-zero diffraction order, said primary exit port being positioned to receive a portion of said non-zero diffraction order.

60. The spectrograph of claim 59 wherein said non-zero order is an order which is imaged most closely to said optical axis of said grating.

61. The spectrograph of claim 60 wherein said non-zero order is a negative first order.

62. The spectrograph of claim 58 wherein said primary entrance port is for receiving light from a primary light source, said spectrograph further comprising a housing around in which said grating and said lens is placed.

63. The spectrograph of claim 58 wherein at least one of said ports is in said primary focal plane.

64. A modified concentric spectrograph comprising:

a grating having an optical axis, a meridian plane, and a concave surface;

a lens having a substantially planar surface, a convex surface, and an optical axis, wherein said convex surface is facing said concave surface, said optical axes are substantially collinear, and wherein a primary focal plane is formed perpendicular to said optical axis facing said planar surface;

a first body comprising an optically transmissive material, said first body having at least three planar surfaces, wherein any pair of said first body planar surfaces intersect to form a respective line of intersection, each respective line of intersection being substantially parallel to the other lines, a first of said first body planar surfaces being located between said primary focal plane and said planar surface of said lens and having a reflective surface disposed thereon, a second of said first body planar surfaces facing said planar surface of said lens, and a third of said first body planar surfaces facing a modified focal plane, said reflective surface forming said modified focal plane at an optical length from said planar lens surface;

a primary entrance port near said modified focal plane at an intersection between a first axis and a second axis, wherein said first axis is parallel to and offset in a first direction from said meridian plane and said second axis is perpendicular to said meridian plane; and a primary exit port near said primary focal plane located at a first perpendicular distance from said meridian plane, said first perpendicular distance being in a second direction opposite said first direction for receiving an order of light that maximizes throughput and minimizes astigmatism.

65. The spectrograph of claim 64 further comprising a second body comprising said optically transmissive material, said second body having at least two substantially parallel planar surfaces, a first of said second body parallel planar surfaces facing said primary exit port, a second of said second body parallel planar surfaces facing said lens.

66. A method for dispersing light comprising:

passing polychromatic light through an entrance port located substantially on a first side of and at a perpendicular distance from a meridian plane of a concave diffraction grating;

directing said polychromatic light with a lens toward said grating so that said light is incident on said grating at least at said meridian plane;

diffracting said light with said diffraction grating, thereby dispersing said light; and imaging said dispersed light with said lens at an exit port located substantially on a second side of said meridian plane for receiving an order of light that maximizes throughput and minimizes astigmatism.

67. A method for diffracting two beams of light using a modified concentric spectrograph, said spectrograph comprising:

a grating having an optical axis, a meridian plane having a first side and a second side, and a concave surface, a lens having a substantially planar surface, a convex surface, and an optical axis, wherein said convex surface faces said concave surface, said optical axes being substantially coaxial, a primary entrance port being located substantially on said first side of said meridian plane, a primary exit port being located substantially on said second side of said meridian plane, a secondary entrance port being located substantially on said first side of said meridian plane, and a secondary exit port being located substantially on said second side of said meridian plane; said method comprising:

diffracting a first light beam comprising:

providing said first beam at said primary entrance port, directing said first beam with said lens toward said grating so that at least a portion of said first beam is incident on said grating surface, reflectively diffracting said first beam with said grating to form a first diffracted beam, and imaging said first diffracted beam with said lens at said primary exit port; and diffracting a second light beam comprising:

providing said second beam at said secondary entrance port, directing said second beam with said lens toward said grating so that at least a portion of said second beam is incident on said grating surface, reflectively diffracting said second beam with said grating to form a second diffracted beam, and imaging said second diffracted beam with said lens at said secondary exit port.

68. A method for diffracting two beams of light using a modified concentric spectrograph, said spectrograph comprising:

a grating having an optical axis, a meridian plane having a first side and a second side, and a concave surface, a lens having a substantially planar surface, a convex surface, and an optical axis, wherein said convex surface is facing said concave surface, said optical axes being substantially coaxial, a primary entrance port being located substantially on said first side of said meridian plane, a primary exit port being located substantially on said second side of said meridian plane for receiving an order of light that maximizes throughput and minimizes astigmatism, a secondary entrance port being located substantially on said second side of said meridian plane, and a secondary exit port being located substantially on said first side of said meridian plane; said method comprising:

diffracting a first light beam comprising:

providing said first beam at said primary entrance port, directing said first beam with said lens toward said grating so that at least a portion of said first beam is incident on said grating surface, reflectively diffracting said first beam with said grating to form a first diffracted beam, and imaging said first diffracted beam with said lens at said primary exit port; and diffracting a second light beam comprising:

providing said second beam at said secondary entrance port, directing said second beam with said lens toward said grating so that at least a portion of said second beam is incident on said grating surface, reflectively diffracting said second beam with said grating to form a second diffracted beam, and imaging said second diffracted beam with said lens at said secondary exit port.

69. A concentric spectrograph for spectrally dispersing polychromatic light comprising:

a grating having a concave surface and an optical axis;

a lens having a substantially planar surface, a convex surface, and an optical axis, wherein said convex surface is facing said concave surface, said optical axes are substantially coaxial, said convex and concave surfaces are substantially concentric, and wherein said lens and said grating are positioned at a distance to form a primary focal plane;

a first port facing said planar surface of said lens;

a first body comprising an optically transmissive material, said transmissive material having an index of refraction, said first body having at least three planar surfaces, wherein any pair of said first body planar surfaces intersect to form a respective line of intersection, each respective line of intersection being substantially parallel to the other lines, a first of said first body planar surfaces being at least partially located between said first port and said lens and having a reflective surface disposed on said first plane forming a modified focal plane, a second of said first body planar surfaces facing said planar surface of said lens, and a third of said first body planar surfaces facing said modified focal plane; and a second port facing said planar surface of said lens and being located near said primary focal plane for receiving an order of light that maximizes throughput and minimizes astigmatism.

70. The spectrograph of claim 69 further comprising a second body comprising said optically transmissive material, said second body having at least two substantially parallel planar surfaces, a first of said second body parallel planar surfaces facing said second port, a second of said second body parallel planar surfaces facing said lens.

71. The spectrograph of claim 69 wherein an angle between said optical axis of said grating and an axis normal to said first of said first body planar surfaces is about 45°.

72. The spectrograph of claim 69 wherein said second surface of said first body is fixedly attached to said planar surface of said lens.

73. The spectrograph of claim 72 further comprising an adhesive having an index of refraction that is substantially the same as the index of refraction of said optically transmissive material for fixedly attaching said first body to said lens.

74. The spectrograph of claim 69 wherein said first body and said lens are integral at said second surface of said first body.

75. The spectrograph of claim 70 wherein said second surface of said second body is fixedly attached to said planar surface of said lens.

76. The spectrograph of claim 75 further comprising an adhesive having an index of refraction that is substantially the same as the index of refraction of said second body for fixedly attaching said second body to said lens.

77. The spectrograph of claim 69 further comprising one or more optically transmissive plates placed so that said polychromatic light passes through said at least one of said plates for varying the position of one of said focal planes.

78. The spectrograph of claim 77 wherein said at least one of said plates is placed between one of said ports and said lens.

79. The spectrograph of claim 77 wherein said at least one of said plates is placed between one of said bodies and one of said ports.

80. The spectrograph of claim 77 wherein said at least one of said plates is placed between one of said bodies and said lens.

81. The spectrograph of claim 77 wherein said at least one of said plates has an index of refraction which is different from said optical bodies.

82. The spectrograph of claim 81 wherein said at least one of said plates comprises sapphire.

83. The spectrograph of claim 77 further comprising at least one optical filter positioned between said lens and one of said bodies.

*84. A method for diffracting two beams of light employing a concentric spectrographic apparatus, the apparatus including a grating, a lens, a primary entrance port, a primary exit port, a secondary entrance port and a secondary exit port, the method comprising the elements of:*

(a) providing a first polychromatic light beam to the primary entrance port;

(b) refracting the first light beam with the lens to diverge the beam toward the grating;

(c) reflectively diffracting the first light beam at the grating to form a first diffracted beam;

(d) imaging the first diffracted light beam with the lens at the primary exit port;

(e) providing a second polychromatic light beam to the secondary entrance port;

(f) refracting the second light beam with the lens to diverge the beam toward the grating; reflectively diffracting the second light beam at the grating to form a second diffracted beam; and (g) imaging the second diffracted light beam with the lens at the secondary exit.

85. A method according to claim 84 wherein elements (e)-(f) are performed during the performance of elements (a)-(d).

86. A method according to claim 84, wherein performance of elements (e)-(f) is alternated with performance of elements (a)-(d).

87. A method according to claim 84 wherein the first and second polychromatic light beams are each provided to the lens at respective lens locations displaced from the meridian plane.

88. A method according to claim 84 wherein the first and second diffracted light beams are each received from the lens at respective locations displaced from the meridian plane.

89. A spectrograph comprising:

a grating having an optical axis, a meridian plane, and a concave surface, said meridian plane having a first side and a second side;

a lens having a substantially planar surface, a convex surface, and an optical axis, wherein said convex surface is facing said concave surface, said optical axes being substantially coaxial or parallel to each other;

a primary entrance port being located substantially out of said meridian plane toward said first side; and a primary exit port being located substantially out of said meridian plane toward said second side for receiving an order of light that tends to maximize throughput and minimize astigmatism.

90. A modified concentric spectrograph comprising:

a grating having an optical axis, a meridian plane, and a concave surface;

a lens having a substantially planar surface, a convex surface, and an optical axis, wherein said convex surface is facing said concave surface, said lens optical axis is substantially coaxial with said grating optical axis, and a primary focal plane is formed perpendicular to said optical axis facing said planar surface of said lens;

a primary entrance port near said primary focal plane at an intersection between a first axis and a second axis, wherein said first axis is parallel to, and offset in a first direction from, said meridian plane and said second axis is perpendicular to said meridian plane and offset from said optical axis; and a primary exit port near said primary focal plane located at a second perpendicular distance from said meridian plane, in a second direction opposite said first direction for receiving an order of light that maximizes throughput and minimizes astigmatism.

91. The spectrograph of claim 90 wherein the primary exit port is located for receiving a negative first order of diffracted light.

92. The spectrograph of claim 90 wherein said exit port is elongated along said first axis.

93. The spectrograph of claim 90 wherein said entrance port is for receiving light from a primary light source, said spectrograph further comprising a housing for preventing light coming from a secondary light source external to said housing from contaminating said light from said primary source in said housing.

94. The spectrograph of claim 90 further comprising:

a secondary entrance port; and a reflective surface between said primary entrance port and said lens, wherein said reflective surface forms a modified focal plane in which said secondary entrance port is located.

95. A modified concentric spectrograph comprising:

a grating having an optical axis, a meridian plane, and a concave surface;

a lens having a substantially planar surface, a convex surface, and an optical axis, wherein said convex surface is facing said concave surface, said optical axes are substantially collinear and said surfaces are substantially concentric, and a primary focal plane is formed perpendicular to said optical axis facing said planar surface of said lens;

a primary entrance port near said primary focal plane at an intersection between a first primary axis and a second primary axis, wherein said first primary axis is parallel to and offset from said meridian plane and said second primary axis is perpendicular to said meridian plane and offset from said grating optical axis;

a primary exit port near said primary focal plane located at a first perpendicular distance from said meridian plane, said first perpendicular distance being in a second direction opposite said first direction for receiving an order of light that maximizes throughput and minimizes astigmatism;

a secondary entrance port near said primary focal plane at an intersection between a first secondary axis and a second secondary axis, wherein said first secondary axis is parallel to and offset from said meridian plane and said second secondary axis is perpendicular to said meridian plane and offset from said grating optical axis; and a secondary exit port near said primary focal plane located at a second perpendicular distance from said meridian plane in said second direction.

96. The spectrograph of claim 95 wherein said non-zero order is a negative first order.

97. The spectrograph of claim 95 wherein said primary entrance port is for receiving light from a primary light source, said spectrograph further comprising a housing in which said grating and said lens is placed.

98. The spectrograph of claim 95 wherein at least one of said ports is in said primary focal plane.

99. A concentric spectrograph comprising:

a diffraction grating having an optical axis, a meridian plane, a grating concave surface and a set of grating grooves on said concave surface, said grating grooves generally extending in a groove direction, and said meridian plane containing the grating optical axis and extending transversely to the grating grooves;

a field lens having a lens convex surface, a relatively planar lens surface, said relatively planar lens surface being relatively planar relative to the shape of said, lens convex surface, and a lens optical axis, wherein said lens convex surface faces and is substantially concentric with said grating concave surface, said optical axes of said

*grating and said lens being substantially coincident and said relatively planar lens surface extending transversely to said lens optical axis;*

*an entrance port positioned to introduce incident polychromatic light to the relatively planar lens surface at a location on said relatively planar lens surface on one side of said meridian plane; and*

*an exit port located to receive diffracted light emerging from said lens planar surface at a location on the other side of the meridian plane from the incident polychromatic light, said entrance and exit ports being positioned relative to said lens convex surface and said grating concave surface to reflect light which is reflected by said lens convex surface towards said grating concave surface for reflection generally towards said lens convex surface to follow a path which avoids said exit port.*

*100. A spectrograph as in claim 89, wherein said optical axes are parallel to and offset from each other.*

*101. A spectrograph as in claim 89, wherein said lens is spherical.*

*102. A concentric spectrograph comprising:*

*a diffraction grating having an optical axis, a meridian plane, a grating concave surface and a set of grating grooves on said concave surface, said grating grooves generally extending in a groove direction, and said meridian plane containing the grating optical axis and extending transversely to the grating grooves;*

*a field lens having a lens convex surface, a relatively planar lens surface, said relatively planar lens surface being relatively planar relative to the shape of said lens convex surface, and a lens optical axis, wherein said optical axes of said grating and said lens substantially coincide and said relatively planar lens surface extends transversely to said lens optical axis;*

*an entrance port positioned to introduce incident polychromatic light to the relatively planar lens surface at a location on said-relatively planar lens surface on one side of said meridian plane; and*

*an exit port located to receive a non-zero order of diffracted light emerging from said lens planar surface at a location on the other side of the meridian plane from the incident polychromatic light, and, overall, to tend to maximize throughput and tend to minimize astigmatism.*

* * * * *

UNITED STATES PATENT AND TRADEMARK OFFICE

CERTIFICATE OF CORRECTION

PATENT NO. : RE42,822 E
APPLICATION NO. : 09/998002
DATED : October 11, 2011
INVENTOR(S) : Slutter et al.

It is certified that error appears in the above-identified patent and that said Letters Patent is hereby corrected as shown below:

On the Title Page:

Item [64], Replace sub-heading, PCT Filed: with sub-heading, Filed.

Signed and Sealed this
First Day of November, 2011

David J. Kappos

David J. Kappos
*Director of the United States Patent and Trademark Office*